US 9,258,578 B2

(12) United States Patent
Schaffer (10) Patent No.: US 9,258,578 B2
(45) Date of Patent: *Feb. 9, 2016

(54) SYSTEM AND METHOD FOR SELECTIVELY TRANSCODING SIGNAL FROM ONE FORMAT TO ONE OF PLURALITY OF FORMATS

(71) Applicant: Google Technology Holdings LLC, Mountain View, CA (US)

(72) Inventor: Mark L. Schaffer, Carlsbad, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,414

(22) Filed: Sep. 8, 2014

(65) Prior Publication Data

US 2014/0380398 A1 Dec. 25, 2014

Related U.S. Application Data

(63) Continuation of application No. 12/948,264, filed on Nov. 17, 2010, now Pat. No. 8,836,857.

(51) Int. Cl.
*H04N 7/10* (2006.01)
*H04N 7/025* (2006.01)
(Continued)

(52) U.S. Cl.
CPC ....... *H04N 21/234309* (2013.01); *H04N 19/12* (2014.11); *H04N 19/162* (2014.11); *H04N 19/164* (2014.11); *H04N 19/40* (2014.11);
(Continued)

(58) Field of Classification Search
CPC ................................. H04N 21/2343
See application file for complete search history.

(56) References Cited

U.S. PATENT DOCUMENTS 7,274,740 B2 9/2007 Van Beek et al.
7,751,477 B2 7/2010 Kwentus et al.
(Continued)

FOREIGN PATENT DOCUMENTS

CN     1949839 A    4/2007
CN   101410816 A    4/2009
(Continued)

OTHER PUBLICATIONS

Office Action for Chinese Patent Application No. CN 201180055597. 4, Jul. 2, 2015, 28 Pages.
(Continued)

*Primary Examiner* — Kyu Chae
(74) *Attorney, Agent, or Firm* — Fenwick & West LLP (57) ABSTRACT

A device is provided for use with an input signal and a selecting signal. The input signal has a first format, and the selecting signal has a first state and a second state. The device comprises a receiving portion and a transcoder portion. The receiving portion can receive the input signal and output a received signal. The transcoder portion is arranged to receive the selecting signal and can output a first transcoded signal when the selecting signal is in the first state and can output a second transcoded signal when the selecting signal is in the second state. The first transcoded signal is based on the received signal and is in a second format. The second transcoded signal is based on the received signal and is in a third format, wherein the first format is different from the second format, the first format is different from the third format and the second format is different from the third format.

20 Claims, 3 Drawing Sheets

(51) Int. Cl.

| | | |
|---|---|---|
| *H04N 7/173* | (2011.01) | |
| *H04N 7/16* | (2011.01) | |
| *H04N 21/2343* | (2011.01) | |
| *H04N 21/222* | (2011.01) | |
| *H04N 19/61* | (2014.01) | |
| *H04N 19/12* | (2014.01) | |
| *H04N 19/162* | (2014.01) | |
| *H04N 19/164* | (2014.01) | |
| *H04N 19/40* | (2014.01) | |
| *H04N 21/258* | (2011.01) | |
| *H04N 21/61* | (2011.01) | |

(52) U.S. Cl.
CPC ............. *H04N19/61* (2014.11); *H04N 21/222* (2013.01); *H04N 21/25841* (2013.01); *H04N 21/6118* (2013.01); *H04N 21/6143* (2013.01)

(56) References Cited

U.S. PATENT DOCUMENTS

| | | | | |
|---|---|---|---|---|
| 8,836,857 | B2* | 9/2014 | Schaffer | ........................ 348/441 |
| 2003/0227977 | A1 | 12/2003 | Henocq | |
| 2005/0008074 | A1* | 1/2005 | van Beek et al. | ........ 375/240.01 |
| 2006/0029108 | A1 | 2/2006 | Miura et al. | |
| 2006/0031889 | A1* | 2/2006 | Bennett et al. | .................. 725/80 |
| 2007/0226365 | A1* | 9/2007 | Hildreth et al. | ................ 709/231 |
| 2010/0054327 | A1 | 3/2010 | Capless | |
| 2013/0128956 | A1 | 5/2013 | Bouillet | |

FOREIGN PATENT DOCUMENTS

| | | |
|---|---|---|
| EP | 16-15447 A1 | 1/2006 |
| EP | 17-75959 A2 | 4/2007 |

OTHER PUBLICATIONS

PCT Search Report and Written Opinion, RE: Application #PCT/US11/058069; Jan. 19, 2012.
Canadian Office Action for CA Application No. 2,828,760, Feb. 24, 2015, 4 pages.
Korean Office Action for KR Application No. 10-2013-7015504, Mar. 30, 2015, 5 pages.
United States Office Action for U.S. Appl. No. 12/948,264, Sep. 5, 2012, 12 pages.
United States Office Action for U.S. Appl. No. 12/948,264, Feb. 26, 2013, 12 pages.
United States Office Action for U.S. Appl. No. 12/948,264, Jul. 18, 2013, 13 pages.
United States Office Action for U.S. Appl. No. 12/948,264, Jan. 24, 2014, 13 pages.

* cited by examiner

SYSTEM AND METHOD FOR SELECTIVELY TRANSCODING SIGNAL FROM ONE FORMAT TO ONE OF PLURALITY OF FORMATS

CROSS REFERENCE TO RELATED APPLICATIONS

This application is a continuation application of U.S. patent application Ser. No. 12/948,264, filed Nov. 17, 2010, which is incorporated by reference herein in its entirety.

BACKGROUND

As technology has developed, the types of devices and media formats that those devices use has multiplied. In a single day, one can come into contact with multiple presentations of the same data, served in different formats. For example, a person may watch the same news transmission on a high definition television, a cellphone or on a laptop. All these devices would be presenting the same data, but using different transmission formats. Each of these transmission formats must take the original source format, such as high definition television, and use a transcoder to change into another format for use. This becomes the problem needing a solution: How to accept one source of data, from the original signal provider, and efficiently change it to multiple output formats.

Conventional integrated receiver decoders (IRDs) can receive RF signals and output digital media streams containing video, audio, and other data. An IRD is often used to provide a link between satellite delivery of media and distribution of that media by cable, telecommunication, and other service providers. New distribution channels such as internet and mobile are creating new challenges for programmers. Currently, programmers rely on their partners to repurpose content but the market for multi-format processing is fragmented.

Currently, programmers may create and have to securely distribute many versions of their content. Satellite programmers (ESPN, HBO, Fox) now must deliver their content to non-traditional displays, including the PCs and mobile devices. Each of these new devices may require a different format and resolution to be applied. Otherwise, their affiliate operators must use third party tools to transcode the programmer's content into different format/resolutions. This will now be described in greater detail.

Media content, including video, audio, images and text are increasingly consumed by way of the Internet. To protect the rights of the content holders, online media content is often provided to users on demand. Accordingly, media content may be centralized and require significant computing and networking power to be able to deliver a satisfactory viewing experience to end users.

To deliver media to end users efficiently, networks must be capable of providing media content in a variety of formats to be consumed on a variety of devices. An example media delivery network will be described with reference to FIG. 1.

Figure 1:
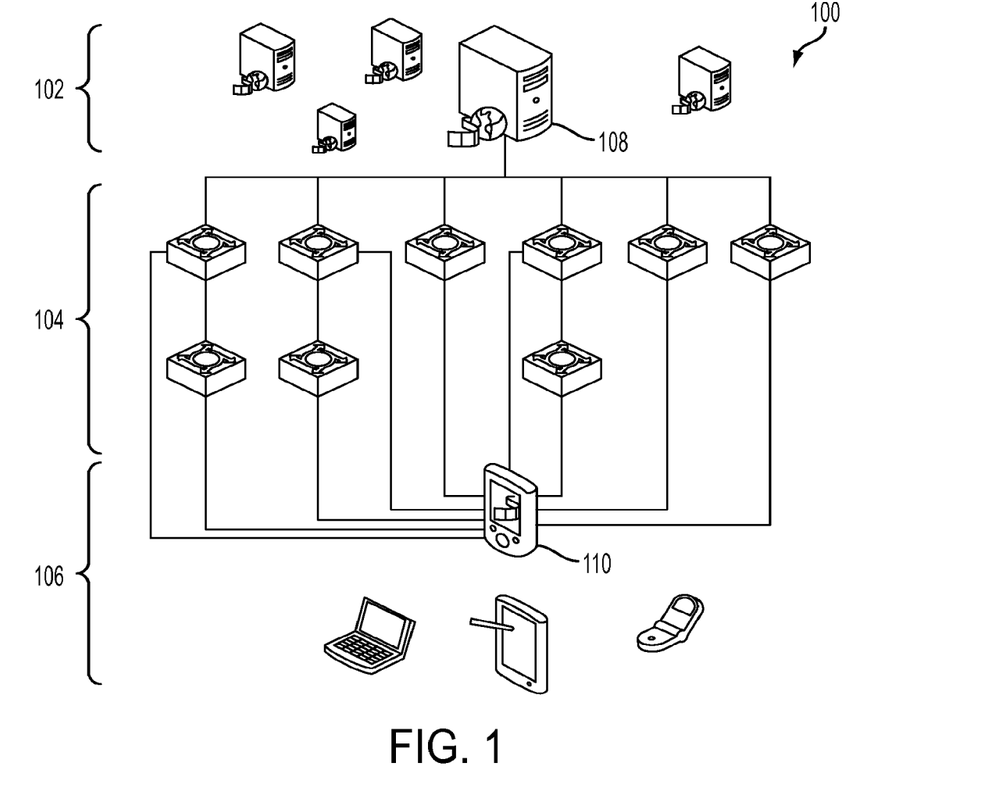
FIG. 1 illustrates a conventional media network.

FIG. 1 illustrates an example media delivery network 100. Devices in media delivery network 100 may be categorized into three classes, media sources 102, media adapters 104 and media renderers 106.

Media sources 102 provide media content, e.g., audio and video data, in a specific format or formats and are capable of transmitting the media content across media delivery network 100. In media delivery network 100, five distinct media sources are illustrated as media sources 102 for purpose of explanation. Of course any number of media sources may be used in a media delivery network. The separate media sources 102 represent media sources that are either: a media source providing a distinct format(s) of media content; and/or a media source providing a format(s) of media content for a distinct geographical area of media renderers 106. For example, one of media sources 102 may provide un-compressed streaming video content to all of media renderers 106.

Media adapters 104 are able to adapt an input format of media content to an output format for the media content. One example method of media format adaptation that media adapters 104 may perform is transcoding. Another example method of media format adaptation that media adapters 104 may perform is data stream switching.

Often, media renderers 106 are unable to render the media content in the format or formats as provided by media sources 102. To address these types of situations, media adapters 104 are able to adapt media content from one format to another format. In particular, media adapters 104 may transcode the media content from the format as provided by media sources 102 into a media content format that may be utilized by media renderers 106. For example, a specific type of media renderer may be a cellular phone that can render media content that has been encoded under the Moving Pictures Expert Group (MPEG) encoding standard, whereas a media source may only provide uncompressed media content data. To address this example situation, a media adapter may be able to transcode the uncompressed media content data as provided by the media source into an MPEG format, which may be utilized by the cellular phone.

As mentioned above, media adapters 104 may additionally adapt an input format of media content to an output format for the media content by data stream switching. In particular, media adapters 104 may be able to receive multiple data streams of media content and output a smaller number of streams. For example, a media adapter of media adapters 104 may be able to receive a first data stream from one media source and to receive a second data stream from another media source. In this situation, the media adapter may be arranged to output one of the two data streams. The output format may then be usable by other media adapters or by specific media renderers 106.

In media delivery network 100, nine distinct media adapters are illustrated as media adapters 104 for purpose of explanation. Of course any number of media adapters may be used in a media delivery network.

Media renderers 106 are devices capable of playing media content from media sources 102 for end users. For example, a specific type of media adapter may be operable to receive streaming video data and output corresponding MPEG encoded video data. In media delivery network 100, four distinct media renderers are illustrated as media renderers 106 for purpose of explanation. Of course any number of media renderers may be used in a media delivery network. The separate media renderers 106 represent media renderers that are either: a media renderers operable to receive a distinct format(s) of media content; and/or a number of media renderer, within a distinct geographical area, that are operable to receive a format(s) of media content. For example, media sources 102 may provide un-compressed streaming video content to all of media renderers 106.

Media delivery network 100 is a conventional three-tier adaptation organization; a first tier of media sources, a second tier of media adaptors and a final tier of media renderers. Of course the second tier of media adaptors may have many levels of adapters, wherein a top level adaptor may change a format received by a media source to a new format, which is then changed to another format by another media adaptor at a lower level, which is then changed to yet another format by yet another media adapter at a yet lower level, and so on. For purposes of explanation however, this multi-level scheme of adapters will be considered a single tier in the conventional three-tier adaptation organization of media delivery network 100. The media content is provided through one of media sources 102, which may be located in a cluster of media servers, or even in different physical locations. An adaptation operation is executed through media adapters 104, each of which is capable of reshaping the media content into certain adapted formats. The destination of the adapted media content is a network of media renderers 106 with diverse types of devices. This generic scenario applies to various types of applications such as classic media streaming through Internet, digital home as described by digital linked network alliance (DLNA) and pervasive peer-to-peer media communication as described by universal plug and play (UPNP) forum.

An example transmission of media content will now be described.

A media source 108 contains a specified media content requested by a media renderer 910. Media source 108 outputs the specified media content to media adapters 104, which modify the media content so that media renderer 910 may efficiently receive and display the specified media content from media source 108.

In a conventional system, there are many users using many media renderers 106 in media delivery network 100. As more users request media content over media delivery network 100, the demand on media sources 102 and media adapters 104 becomes larger. Eventually, demand may surpass the amount of content that media delivery network 100 is capable of providing. In such a case at least one media renderer would not be able to render media.

There are many inefficiencies inherent in the present ad hoc approach to transcoding broadcast transmissions into multiple formats.

Figure 2:
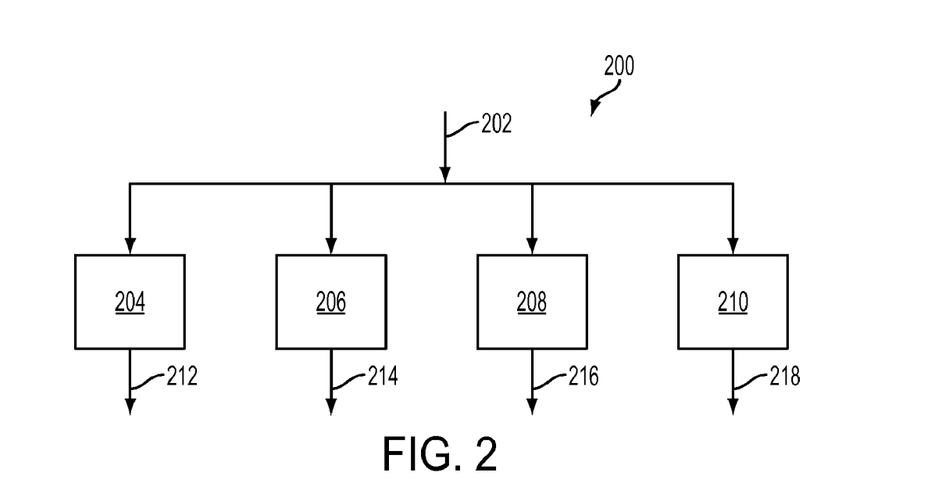
FIG. 2 illustrates a prior art transcoding system.

FIG. 2 illustrates a prior art transcoding system 200.

As illustrated in the figure, transcoding system 200 includes a transcoder 204, a transcoder 206, a transcoder 208 and a transcoder 210.

Transcoder 204, transcoder 206, transcoder 208 and transcoder 210 are arranged to receive signal 202.

Transcoder 204, transcoder 206, transcoder 208 or transcoder 210 accepts signal 202. For example, signal 202 may be provided by a cable or satellite provider. This signal may be in any one of a number of known formats, each of which includes: a specific type of encoding, such as MPEG, PDA, cellphone or high definition television; and a specific geographical distribution, for example to what area of destination the signal is to be transmitted. For purposes of discussion, assume that signal 202 is in high definition format, for distribution throughout the United States.

Each of transcoder 204, transcoder 206, transcoder 208 and transcoder 210 is capable of reformatting the signal 202 into another format. For example, assume that transcoder 204 is capable of transcoding high definition television format into standard definition format, for distribution throughout the United States. Assume that transcoder 206 is capable of transcoding the high definition television format into MPEG format, to the west coast of the United States. Assume that transcoder 208 is capable of transcoding the high definition television format into PDA format, to the East coast of the United States. Assume that transcoder 210 is capable of transcoding the high definition television format into cellphone format, to the state of New York. The appropriately reformatted signal from an individual transcoder is output as signal 212, 214, 216 or 218.

In operation, presume that service provider signal 202 is in high definition television format. Signal 202 is received by transcoder 204, transcoder 206, transcoder 208 and transcoder 210, where it is decoded, including instructions for an output signal type. After transcoding, a newly formatted signal is output to an end user as one of signal 212, signal 214, signal 216 or signal 218.

The shortcoming of prior art transcoding system 200 is that service provider signal 202 can only be sent to one transcoder at a time. Given the complex requirements for multiple signal outputs, this is a cumbersome methodology.

What is needed is a system and method for efficiently transcoding a signal from one format to a plurality of formats.

BRIEF SUMMARY

The present invention provides a system and method for efficiently transcoding a signal from one format to a plurality of formats.

In accordance with an aspect of the present invention, a device is provided for use with an input signal and a selecting signal. The input signal has a first format, and the selecting signal has a first state and a second state. The device comprises a receiving portion and a transcoder portion. The receiving portion can receive the input signal and output a received signal. The transcoder portion is arranged to receive the selecting signal and can output a first transcoded signal when the selecting signal is in the first state and can output a second transcoded signal when the selecting signal is in the second state. The first transcoded signal is based on the received signal and is in a second format. The second transcoded signal is based on the received signal and is in a third format, wherein the first format is different from the second format, the first format is different from the third format and the second format is different from the third format.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Systems and methods in accordance with aspects of the present invention combine several well understood features of IRDs, remote authentication, and multi-format transcoding to enable programmers to use IRDs in a new way. Specifically, systems and methods in accordance with aspects of the present invention enable programmers to control video quality and access to programming, and provide a way of consolidating and simplifying distribution, while using a conditional access method that they have used for years.

A device in accordance with aspects of the present invention includes an integrated receiver decoder (IRD) operable to support output of multiple formats that can be different than the input format. Instead of the programmer authoring and then securely delivering multiple versions of the same content, they could instead deliver their content only once as a superset of resolution/format, and have a downstream device, under their control, transcode this content to multiple formats/resolutions as required.

Programmers can employ a system and method in accordance with aspects of the present invention with their traditional HD distribution systems, deploying enhanced transcoder IRDs with storage that are fully under their command and control. The transcoded content can then be securely distributed to new distribution pipes. A system and method in accordance with aspects of the present invention may include storage and/or enhanced audio/video transcoding capability, which can be authorized remotely by programmers to provide/distribute multiple format of their content for use by non-traditional display devices.

Additionally, an aspect in accordance with the present invention has a selecting signal that allows for the remote determination as to which transcoding portion to output the decoded service provider signal. In doing so, a service provider signal in one format can be transcoded and output in a plurality of different formats.

Further, an aspect in accordance with the present invention has a programming signal that allows for the remote programming of the transcoding portion to output a desired decoded service provider signal. In doing so, a service provider signal in one format can be transcoded and output in a plurality of new formats.

Example embodiments in accordance with the present invention will now be described with reference to FIG. 3 through FIG. 5.

Figure 3:
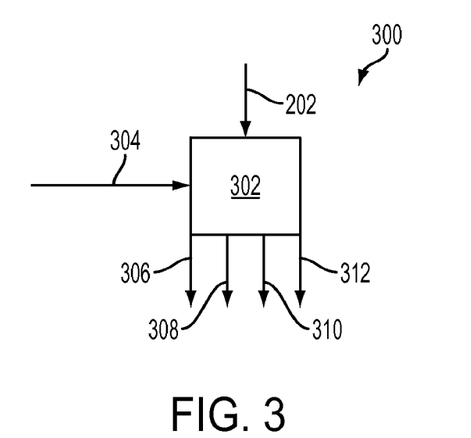
FIG. 3 illustrates an example transcoder in accordance with an aspect of the present invention.

FIG. 3 illustrates an example transcoder 300 in accordance with an aspect of the present invention.

As illustrated in the figure, transcoder 300 receives signal 202 and outputs at least one of transcoded signal 306, transcoded signal 308, transcoded signal 310 and transcoded signal 312.

Transcoder 302 is arranged to receive service provider signal 202.

In operation, presume that service provider signal 202 is in high definition format, for distribution throughout the United States. In accordance with an aspect of the present invention, signal 202 is received by transcoder 302, where it uses the selecting signal 304 to determine the output signal type. From here transcoded signal 306 is output as one format, transcoded signal 308 is output as another format, transcoded signal 310 is output as yet another format and transcoded signal 312 is output as still another format. Again, the formats may be distinguished by: a specific type of encoding, such as MPEG, PDA, cellphone or high definition television; and a specific geographical distribution, for example to what area of destination the signal is to be transmitted. Further, more than one of transcoded signal 306, transcoded signal 308, transcoded signal 310 and transcoded signal 312 may be the same format to account for an increased demand for a particular format.

In accordance with aspects of the present invention, the service provider signal 202 has a transcoder portion indicated for use by the content of selecting signal 304.

Example specific components for accomplishing multiple format conversions are introduced below.

Figure 4:
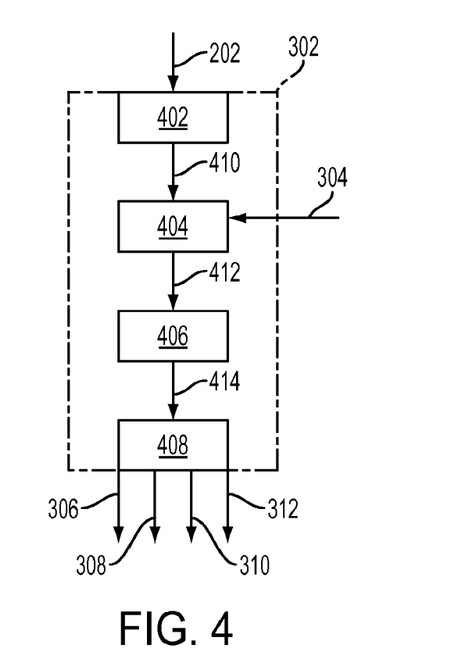
FIG. 4 illustrates an example transcoder in accordance with an aspect of the present invention.

FIG. 4 illustrates an example transcoder 302 in accordance with an aspect of the present invention.

As illustrated in the figure, transcoder 302 includes a receiver portion 402, a decoder portion 404, a transcoder portion 406 and a transmitter portion 408.

Receiver portion 402 is arranged to receive service provider signal 202 and output a received signal 410. Decoder portion 404 is arranged to receive received signal 410 and to output to transcoder portion 406 and optionally to a data storage (not shown). Transcoder portion 406 is arranged to receive decoded signal 412 and to output a transmit signal 414. Transmitter portion 408 is arranged to receive transmit signal 414 and to output at least one of transcoded signal 306, transcoded signal 308, transcoded signal 310 and transcoded signal 312.

Decoder portion 404 uses signal 304 to dictate the type of signal conversion. Signal 304 contains instructions as to what formats of output signal are required. These instructions dictate to which transcoders the output signal 414 will be sent. Decoder portion 404 outputs via signal 412 to transcoder portion 406.

Transcoder portion 406 receives signal 412 and changes the format of signal 412 from the original service provider signal format to the signal formats determined by signal 304. Transcoder portion 406 performs operations and outputs the signal via signal 414 to transmitter portion 408.

In operation, presume that service provider signal 202 is in high definition format, for distribution throughout the United States. In accordance with aspects of the present invention, signal 202 is received by receiver portion 402, which routes signal 202 as signal 410 to decoder portion 404. Further presume that service provider signal 202, as required by signal 304, is to be transcoded into not just one output signal format but a plurality output signal formats. A system in accordance with aspects of the present invention may include a plurality different transcoder portions with the capability of transcoding one input signal, of one format, and outputting a plurality differently formatted transcoded output signals. For purposes of discussion herein, a non-limiting example embodiment will be described that includes four different transcoder portions with the capability of transcoding one input signal, of one format, and outputting four differently formatted transcoded output signals.

Decoder portion 404 receives selecting signal 304. Decoder portion 404 authenticates signal 410 against a list of rules about security and user privileges. Here, several things can occur, data from signal 410 may be sent to a data storage (not shown) for later use or signal 410 can be sent via signal 412 to transcoder portion 406.

The state of selecting signal 304 determines one of a plurality of transcoded output formats for transcoder portion 406. Transcoder portion 406 transcodes signal 410 to the selected new output format and transmits signal 414 to transmitter portion 408.

Transmitter portion 408 uses programmer's code to authenticate whether the downstream client is the correct client, as designated by the selecting signal 304, and whether the downstream client has the proper security clearance and protocols in place. The transcoded signal is then output to the downstream client's receiver via one of signal 306, signal 308, signal 310 or signal 312.

An example transcoder in accordance with aspects of the present invention will now be discussed.

Figure 5:
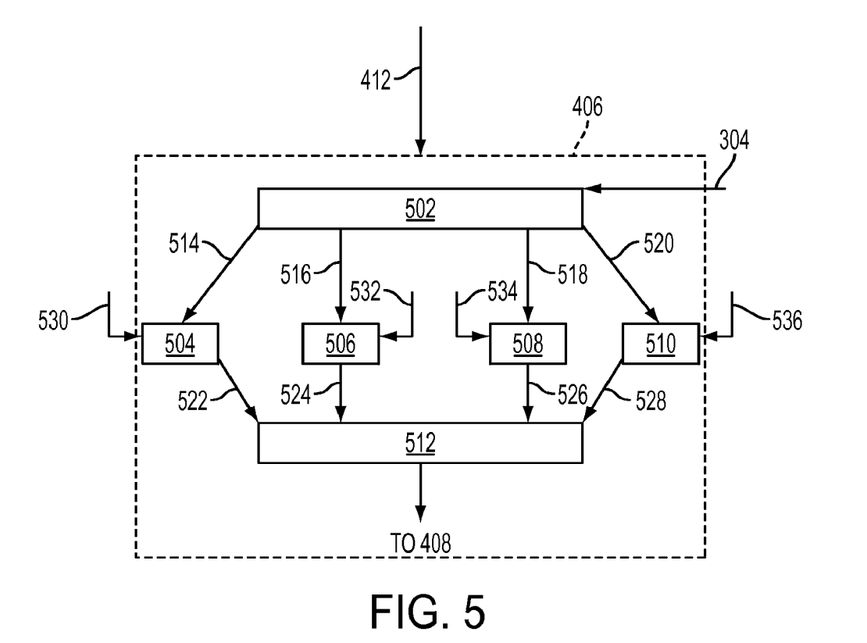
FIG. 5 illustrates an example transcoder portion 406 in accordance with an aspect of the present invention.

FIG. 5 illustrates an example transcoder portion 406 in accordance with an aspect of the present invention.

As illustrated in the figure, transcoder portion 406 includes a selector 502, a transcoding portion 504, a transcoding portion 506, a transcoding portion 508 and a transcoding portion 510, and an authenticator 428.

Selector 502 is arranged to receive the signal from decoder portion 404. Individual transcoding portions 504, 506, 508 and 510 are arranged to receive the signal from selector 502. Authenticator 428 is arranged to receive the signal from any of transcoding portions 504, 506, 508 or 510.

Selector 502 receives signal 412 from decoder portion 404. Selector 502 selects transcoding portion 504, 506, 508 or 510 based on signal 304. For example, signal 304 may be provided as a state signal by the operator of transcoder 300, e.g., a cable or satellite provider, or may be provided by the content provider. For purposes of discussion, presume that signal 304 is provided by the operator of transcoder 300 and is a four bit binary signal, wherein the first bit corresponds to transcoding portion 504, the second bit corresponds to transcoding portion 506, the third bit corresponds to transcoding portion 508 and the fourth bit corresponds to transcoding portion 510. Each of the four bits will be used to enable one of transcoding portion 504, 506, 508 or 510, respectively. In other embodiments, if more transcoding portions are used, additional bits may be needed for signal 304.

Signal 412 may be in any one of a number of known formats. For purposes of discussion assume that the signal is in high definition format, for distribution throughout the United States. Each of transcoding portion 504, transcoding portion 506, transcoding portion 508 and transcoding portion 510 is capable of reformatting signal 412 into another format. For example, presume that transcoding portion 504 is capable of transcoding high definition television format into standard definition format, for distribution throughout the United States. Presume that transcoding portion 506 is capable of transcoding the high definition television format into MPEG format, to the west coast of the United States. Presume that transcoding portion 508 is capable of transcoding the high definition television format into PDA format, to the East coast of the United States. Presume that transcoding portion 510 is capable of transcoding the high definition television format into cellphone format, to the state of New York. The reformatted signals from individual transcoding portions are output via at least signals 522, 524, 526 and 528 to authenticator 512. Authenticator 512 outputs the signals to transmitter portion 408.

In operation, signal 412 is the output signal from decoder portion 404. This signal is received by transcoder 406, whose function is broken down into components in FIG. 5.

Inside transcoder 406, the signal is read and selector 502 uses the input from selecting signal 304 to determine the required output format. The signal is then sent via output signal 514, 516, 518 or 520 to the appropriate portion. Transcoding portion 504, 506, 508 or 510 transcodes the signal as required. The transcoded signal is then output via signal 522, 524, 526 or 528 to authenticator 512.

Authenticator 512 authenticates the signal as to downstream receiver privileges and security issues. The signal is then output to the transmitter portion 408.

In accordance with another aspect of the present invention, each of transcoding portions 504, 506, 508 and 510 may be remotely programmed. In particular, the operator of transcoder 300 may provide: programming signal 530 to transcoding portion 504 to enable transcoding portion 504 to transcode output signal 514 to a new format that is different than the format of signal 522; programming signal 532 to transcoding portion 506 to enable transcoding portion 506 to transcode output signal 516 to a new format that is different than the format of signal 524; programming signal 534 to transcoding portion 508 to enable transcoding portion 508 to transcode output signal 518 to a new format that is different than the format of signal 526; and programming signal 536 to transcoding portion 510 to enable transcoding portion 510 to transcode output signal 520 to a new format that is different than the format of signal 528.

With the ability to remotely program each of transcoding portions 504, 506, 508 and 510, the operator of transcoder 300 may adapt its services to a changing demand. For example, suppose there is an instant market for the provided content in a format of a standard TV encoded scheme throughout the United States. Further, returning to FIG. 4, suppose that transmitter portion 408 is limited in its capacity to dedicate a transmission of output signal 306, which corresponds to the transcoded signal provided by transcoding portion 504, which provides a format of a standard TV encoded scheme throughout the United States. Now, suppose the instant market for the provided content in a format of a standard TV encoded scheme throughout the United States is more than that which transmitter portion 408 can provide through output signal 306. In accordance with an aspect of the present invention, the operator of transcoder 300 may reprogram any of transcoding portion 506, 508 and 510 to provide format of a standard TV encoded scheme throughout the United States in order to meet the demand.

Aspects of the present invention may additionally be used in an adaptive streaming system. Streaming is the process of providing content to a client device, and using a codec to decode the content. Adaptive streaming is the process of seamlessly switching between channels having the same content, but with different resolutions, in order to maximize network use in the face of changing network constraints.

For purposes of explanation, presume that a passenger in a moving vehicle is receiving and playing television content on a portable device. Suppose at time $t_1$, the portable device is receiving the signal having the television content from a channel having low usage, e.g., not many other users on the channel, and having a high available bandwidth. In this case, the portable device would tune to the highest resolution channel having the television content. Now, suppose at time $t_2$, the portable device is receiving the signal having the television content from a channel having high usage, e.g., many other users on the channel, and having a low available bandwidth. In this case, the portable device would tune to the lowest resolution channel having the television content. However, the content on the highest resolution channel and the content on the lowest resolution channel must be synchronized such that when the portable device switches from the highest resolution channel to the lowest resolution channel, the switch will be seamless to the user watching the content.

An example transcoder in accordance with aspects of the present invention may be used with an adaptive streaming system. For example, returning to FIG. 3, transcoder 302 may provide a plurality of streams of similar content with different resolutions. For example, transcoded signal 306 may be television content provided at a low resolution, whereas transcoded signal 308 may be the same television content at a high resolution. In this situation, transcoder 302 would assure that transcoded signal 306 and transcoded signal 308 are synchronized. As such, if a receiving device were to switch from receiving transcoded signal 306 to receiving transcoded signal 308, the switch would appear seamless.

Some or all of the operations of the elements set forth in FIGS. 3-5 may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices. Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Prior art as shown in FIG. 2 had several disadvantages. It could only take in a signal from the service provider and one-at-a-time transcode the signal and send it to a downstream target. Prior art provided one layer of authentication for security, for the upstream sender, but did not authenticate for the downstream receiver. The system was very static and non-dynamic in use and severely limited user flexibility and efficiency.

In accordance aspects of the present invention several new feature expand the flexibility and efficiency of use. The selecting signal enables a transcoder to be remotely configured for outputting any of a plurality of formats. A data storage (not shown) offers the opportunity to transcode a signal once, store it, then transcode it later into yet other formats. Finally, the second authenticator provides a set of security checks for qualifying the privileges and requirements of the downstream receiver.

The uniqueness of the new technology lay in its flexibility, to receive a service provider input signal in one format, use the instructions from selector signal 304, and output a signal as one of a plurality of different formats. Further, a transcoder in accordance with aspects of the present invention may be used to additionally provide adaptive streaming services, by remotely configuring a transcoder to provide a plurality of streams of different resolutions of content.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed:

1. A device comprising:
a selector configured to:
receive an input signal in a first format;
receive a selecting binary signal including a first bit corresponding to a first transcoding portion and a second bit corresponding to a second transcoding portion, the first bit indicating whether the input signal is to be transcoded by the first transcoding portion to a second format and the second bit indicating whether the input signal is to be transcoded by the second transcoding portion to a third format different than the second format;
transmit the input signal to the first transcoding portion responsive to the first bit of the selecting binary signal indicating that the input signal be transcoded by the first transcoding portion to the second format, the second format selected based on a first geographic region of a first client device that is to receive the input signal; and
transmit the input signal to the second transcoding portion responsive to the second bit of the selecting binary signal indicating that the input signal be transcoded by the second transcoding portion to the third format, the third format selected based on a second geographic region of a second client device that is to receive the input signal;
the first transcoding portion configured to:
responsive to receiving the input signal from the selector, transcode the input signal to produce a first transcoded signal in the second format and transmit the first transcoded signal for receipt by the first client device; and
the second transcoding portion configured to:
responsive to receiving the input signal from the selector, transcode the input signal to produce a second transcoded signal in the third format and transmit the second transcoded signal for receipt by the second client device.

2. The device of claim 1, wherein the first transcoding portion is programmed to transcode to the second format and the second transcoding portion is programmed to transcode to the third format based on instructions received from a remote operator.

3. The device of claim 2, wherein the first transcoding portion is reprogrammed to transcode to a fourth format based on additional instructions received from the remote operator.

4. The device of claim 1, wherein the selector is further configured to authenticate that the first client device is authorized to receive the input signal in response to the selecting binary signal indicating that the input signal be transcoded for receipt by the first client device.

5. The device of claim 1, wherein the selecting binary signal is received from a content provider.

6. The device of claim 1, wherein the selecting binary signal is received from a cable service provider.

7. The device of claim 1, wherein the selecting binary signal is received from a satellite service provider.

8. A method comprising:
receiving an input signal in a first format;
receiving a selecting binary signal including a first bit corresponding to a first transcoding portion of a transcoder and a second bit corresponding to a second transcoding portion of the transcoder, the first bit indicating whether the input signal is to be transcoded by the first transcoding portion to a second format and the second bit indicating whether the input signal is to be transcoded by the second transcoding portion to a third format different than the second format;
responsive to the first bit of the selecting binary signal indicating that the input signal be transcoded by the first transcoding portion to the second format:
transcoding, by the first transcoding portion, the input signal to produce a first transcoded signal in the second format, the second format selected based on a first geographic region of a first client device that is to receive the input signal; and transmitting the first transcoded signal to the first client device; and responsive to the second bit of the selecting binary signal indicating that the input signal be transcoded by the second transcoding portion to the third format:

transcoding, by the second transcoding portion, the input signal to produce a second transcoded signal in the third format, the third format selected based on a second geographic region of a second client device that is to receive the input signal; and transmitting the second transcoded signal to the second client device.

9. The method of claim 8, wherein the first transcoding portion is programmed to transcode to the second format and the second transcoding portion is programmed to transcode to the third format based on instructions received from a remote operator.

10. The method of claim 9, wherein the first transcoding portion is reprogrammed to transcode to a fourth format based on additional instructions received from the remote operator.

11. The method of claim 8, wherein the selector is further configured to authenticate that the first client device is authorized to receive the input signal in response to the selecting binary signal indicating that the input signal be transcoded for receipt by the first client device.

12. The method of claim 8, wherein the selecting binary signal is received from a content provider.

13. The method of claim 8, wherein the selecting binary signal is received from a cable service provider.

14. The method of claim 8, wherein the selecting binary signal is received from a satellite service provider.

15. A non-transitory computer-readable storage media having computer readable instructions executed by one or more processors for:

receiving an input signal in a first format;

receiving a selecting binary signal including a first bit corresponding to a first transcoding portion of a transcoder and a second bit corresponding to a second transcoding portion of the transcoder, the first bit indicating whether the input signal is to be transcoded by the first transcoding portion to a second format and the second bit indicating whether the input signal is to be transcoded by the second transcoding portion to a third format different than the second format;

responsive to the first bit of the selecting binary signal indicating that the input signal be transcoded by the first transcoding portion to the second format:

transcoding, by the first transcoding portion, the input signal to produce a first transcoded signal in the second format, the second format selected based on a first geographic region of a first client device that is to receive the input signal; and transmitting the first transcoded signal to the first client device; and responsive to the second bit of the selecting binary signal indicating that the input signal be transcoded by the second transcoding portion to the third format:

transcoding, by the second transcoding portion, the input signal to produce a second transcoded signal in the third format, the third format selected based on a second geographic region of a second client device that is to receive the input signal; and transmitting the second transcoded signal to the second client device.

16. The storage media of claim 15, wherein the first transcoding portion is programmed to transcode to the second format and the second transcoding portion is programmed to transcode to the third format based on instructions received from a remote operator.

17. The storage media of claim 16, wherein the first transcoding portion is reprogrammed to transcode to a fourth format based on additional instructions received from the remote operator.

18. The storage media of claim 15, wherein the selector is further configured to authenticate that the first client device is authorized to receive the input signal in response to the selecting binary signal indicating that the input signal be transcoded for receipt by the first client device.

19. The storage media of claim 15, wherein the selecting binary signal is received from a content provider.

20. The storage media of claim 15, wherein the selecting binary signal is received from a cable service provider.

* * * * *